United States Patent Office.

JOHN HIGBIE, OF RONDOUT, NEW YORK.

Letters Patent No. 64,669, dated May 14, 1867.

IMPROVEMENT IN THE MANUFACTURE OF VINEGAR.

The Schedule referred to in these Letters Patent and making part of the same.

TO ALL WHOM IT MAY CONCERN:

Be it known that I, JOHN HIGBIE, of Rondout, in the county of Ulster, and State of New York, have invented a new and useful Improvement in the Manufacture of Vinegar; and I do hereby declare that the following is a full, clear, and exact description thereof, which will enable others skilled in the art to fully understand and make use of the same.

This invention relates to an improved process for the manufacture of vinegar from apples, including the skins and cores, the refuse going to make, when mixed with steamed potatoes, ground feed, and refuse milk, where convenient, an excellent feed for pigs.

My process is conducted in the following manner: Take five bushels of apples for a barrel of thirty-one and a half gallons, boil them thoroughly in water until they fall to pieces on being stirred and mashed. The boiler should have a copper bottom, not iron, as iron blackens the product. Two four-inch joists are to be laid on the bottom of a barrel shaped like a leach-tub, but having a faucet instead of holes at the bottom. A loose head is to be laid on the joists and covered with a quantity of clean straw. The boiled apples are then placed on the straw and boiling water poured upon them and drawn off when it has passed through the apples to the faucet. Boiling water is to be added until thirty-one and a half gallons have been drawn off for five bushels of apples. Now add a gallon of the cheapest molasses, and place the whole into a vinegar barrel containing any quantity of mother liquor. It should then be set aside where a tolerably equable temperature can be maintained, and by the next summer it will be an excellent vinegar.

The refuse of the apples may now be mixed with about an equal quantity of steamed potatoes, ground feed of any kind, and refuse milk, when procurable, and they together form an excellent feed for pigs.

I claim as new, and desire to secure by Letters Patent—

The improved process for the manufacture of vinegar from apples, substantially as shown and described.

JOHN HIGBIE.

Witnesses:
HENRY ROUSE,
O. D. PALMER.